(12) United States Patent
Yachida

(10) Patent No.: US 11,972,555 B2
(45) Date of Patent: Apr. 30, 2024

(54) PRODUCT-INSPECTION APPARATUS, PRODUCT-INSPECTION METHOD, AND NON-TRANSITORY COMPUTER READABLE MEDIUM

(71) Applicant: NEC Corporation, Tokyo (JP)

(72) Inventor: Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 17/437,631

(22) PCT Filed: Mar. 19, 2019

(86) PCT No.: PCT/JP2019/011346
§ 371 (c)(1),
(2) Date: Sep. 9, 2021

(87) PCT Pub. No.: WO2020/188728
PCT Pub. Date: Sep. 24, 2020

(65) Prior Publication Data
US 2022/0148144 A1 May 12, 2022

(51) Int. Cl.
*H04N 23/74* (2023.01)
*B06B 1/02* (2006.01)
(Continued)

(52) U.S. Cl.
CPC .......... *G06T 7/001* (2013.01); *B06B 1/0207* (2013.01); *G06V 10/751* (2022.01); *H04N 23/74* (2023.01)

(58) Field of Classification Search
None
See application file for complete search history.

(56) References Cited

U.S. PATENT DOCUMENTS

2015/0234047 A1* 8/2015 Fukasawa ............... G01S 17/04
250/341.8
2015/0278250 A1* 10/2015 Yachida ............... G06V 10/758
382/190
(Continued)

FOREIGN PATENT DOCUMENTS

JP H01-272948 A 10/1989
JP H03-51748 A 3/1991
(Continued)

OTHER PUBLICATIONS

Extended European Search Report for EP Application No. EP19920093.2 dated Feb. 11, 2022.
(Continued)

*Primary Examiner* — Eileen M Adams

(57) ABSTRACT

A product-inspection apparatus includes a vibration unit configured to vibrate an object to be inspected at different vibration frequencies in a stepwise manner, the object to be inspected being a product in which a powder is contained in a container, a light source configured to apply light onto an upper surface of the powder, an imaging unit configured to take an image of the upper surface of the powder at a frame rate equal to or higher than a maximum vibration frequency of the vibration unit, and a determination unit configured to determine whether or not the object to be inspected is a quality product based on image information taken by the imaging unit.

15 Claims, 6 Drawing Sheets

(51) Int. Cl.
    *G06T 7/00*     (2017.01)
    *G06V 10/75*    (2022.01)

(56) References Cited

U.S. PATENT DOCUMENTS

| | | | |
|---|---|---|---|
| 2019/0257766 A1* | 8/2019 | Yang | G01N 21/95 |
| 2019/0375018 A1* | 12/2019 | Erno | B22F 3/24 |
| 2020/0182836 A1 | 6/2020 | Werk et al. | |

FOREIGN PATENT DOCUMENTS

| | | |
|---|---|---|
| JP | 2000-298103 A | 10/2000 |
| JP | 2001-004549 A | 1/2001 |
| JP | 2004-257937 A | 9/2004 |
| JP | 2005-030810 A | 2/2005 |
| JP | 2010-008339 A | 1/2010 |
| JP | 5307459 B2 | 1/2010 |
| JP | 2011-080936 A | 4/2011 |
| JP | 2014-006186 A | 1/2014 |
| JP | 2014-145652 A | 8/2014 |
| WO | 2018/002049 | 1/2018 |

OTHER PUBLICATIONS

International Search Report for PCT Application No. PCT/JP2019/011346, dated Jun. 25, 2019.

* cited by examiner

PRODUCT-INSPECTION APPARATUS, PRODUCT-INSPECTION METHOD, AND NON-TRANSITORY COMPUTER READABLE MEDIUM

This application is a National Stage Entry of PCT/JP2019/011346 filed on Mar. 19, 2019, the contents of all of which are incorporated herein by reference, in their entirety.

TECHNICAL FIELD

The present disclosure relates to a product-inspection apparatus, a product-inspection method, and a non-transitory computer readable medium.

BACKGROUND ART

An ordinary product-inspection apparatus is configured to determine whether or not an object to be inspected, which is an object in which an object to be contained is contained in a container, is a quality product by determining whether or not a foreign substance is contained in the object to be inspected. For example, a product-inspection apparatus disclosed in Patent Literature 1 is configured to, while applying vertical and horizontal vibrations to an object to be inspected, which is an object in which a powder is contained in a transparent container, and thereby making the powder circulate and flow therein, take an image of the circulating and flowing powder through a wall surface of the transparent container in which the powder is in contact with the inner surface thereof, and thereby to determine whether or not a foreign substance is contained in the object to be inspected based on the taken image information.

CITATION LIST

Patent Literature

Patent Literature 1: Japanese Patent No. 5307459

SUMMARY OF INVENTION

Technical Problem

Regarding the ordinary product-inspection apparatus, there are cases in which foreign substances having different volumes may not be satisfactorily detected, thus causing a problem that the accuracy of the product-inspection of an object to be inspected is poor.

One of the objects that example embodiments disclosed in this specification are intended to achieve is to provide a product-inspection apparatus, a product-inspection method, and a non-transitory computer readable medium capable of contributing to solving the above-described problem. Note that the aforementioned object is merely one of a plurality of objects that a plurality of example embodiments disclosed in this specification are intended to achieve. Other objects or problems and novel features will be made apparent from the following description in this specification and the accompanying drawings.

Solution to Problem

A product-inspection apparatus according to a first aspect includes:
a vibration unit configured to vibrate an object to be inspected at different vibration frequencies in a stepwise manner, the object to be inspected being an object in which a powder is contained in a container;
a light source configured to apply light onto an upper surface of the powder;
an imaging unit configured to take an image of the upper surface of the powder at a frame rate equal to or higher than a maximum vibration frequency of the vibration unit; and a determination unit configured to determine whether or not the object to be inspected is a quality product based on image information taken by the imaging unit.

A product-inspection method according to a second aspect includes:
vibrating an object to be inspected at different vibration frequencies in a stepwise manner, the object to be inspected being an object in which a powder is contained in a container;
applying light onto an upper surface of the powder;
taking an image of the upper surface of the powder at a frame rate equal to or higher than a maximum vibration frequency among the stepwise-changed vibration frequencies; and
determining whether or not the object to be inspected is a quality product based on the taken image information.

A non-transitory computer readable medium according to a third aspect stores a program for causing a computer to:
vibrate an object to be inspected at different vibration frequencies in a stepwise manner, the object to be inspected being an object in which a powder is contained in a container;
apply light onto an upper surface of the powder;
take an image of the upper surface of the powder at a frame rate equal to or higher than a maximum vibration frequency among the stepwise-changed vibration frequencies; and
determine whether or not the object to be inspected is a quality product based on the taken image information.

Advantageous Effects of Invention

According to the above-described aspects, it is possible to provide a product-inspection apparatus, a product-inspection method, and a non-transitory computer readable medium capable of contributing to the improvement of the accuracy of detection in an object to be inspected.

DESCRIPTION OF EMBODIMENTS

A best mode for carrying out the present disclosure will be described hereinafter with reference to the accompanying drawings. However, the present disclosure is not limited to the below-shown example embodiments. Further, to clarify the explanation, the following description and drawings are simplified as appropriate.

First Example Embodiment

In a product-inspection apparatus and a product-inspection method according to this example embodiment, a foreign substance contained in an object to be inspected, which is an object in which a powder is hermetically contained in a container, is made to float in the powder by vibrating the object to be inspected, so that the foreign substance is exposed from the upper surface of the powder. By doing so, the foreign substance contained in the object to be inspected is detected.

Powder medicines such as oral medicines or injection medicines are suitable as the powder. However, the powder may be any substance in a powdery form, and may be a foodstuff or the like. The container is an optically-transparent vial, an optically transparent ampule, or an optically transparent test tube. The foreign substance is a substance different from the powder. Examples of the foreign substance include a piece of a fiber such as a cloth, a piece of hair falling from a human body, a piece of metal such as a piece of a component in a production line for the object to be inspected or the like, and a piece of resin and a piece of glass such as a piece of a container.

Figure 1:
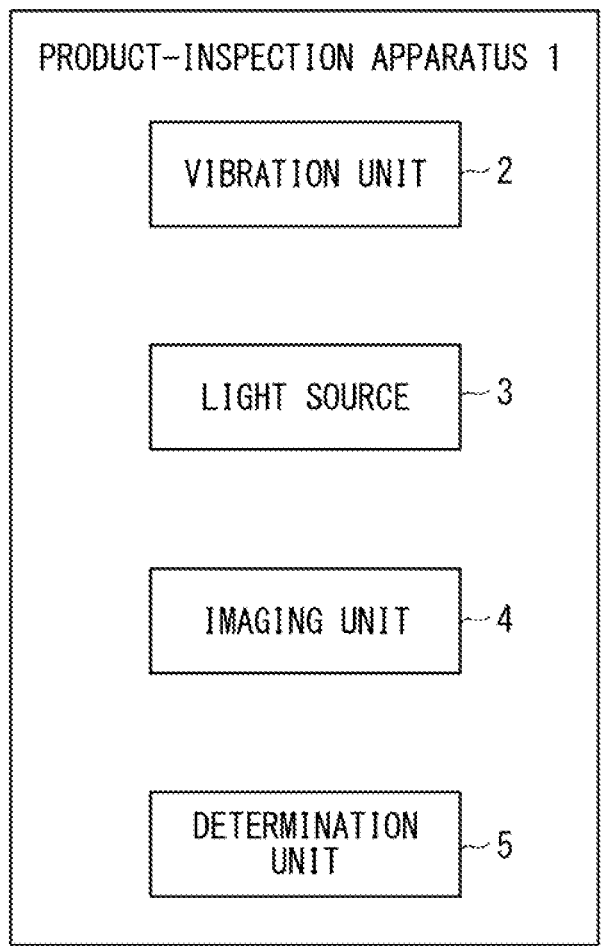
FIG. 1 is a block diagram showing a minimum configuration of a product-inspection apparatus according to a first example embodiment.

Firstly, a minimum configuration of a product-inspection apparatus according to this example embodiment will be described. FIG. 1 is a block diagram showing a minimum configuration of a product-inspection apparatus according to this example embodiment. As shown in FIG. 1, the product-inspection apparatus 1 includes a vibration unit 2, a light source 3, an imaging unit 4, and a determination unit 5. The vibration unit 2 vibrates an object to be inspected, which is an object in which a powder is contained in a container, at different vibration frequencies in a stepwise manner.

Note that the vibration frequency at which a foreign substance floats changes depending on, for example, the relation (e.g., the ratio or the like) between the average product size of the powder and the volume of the foreign substance that it is presumed may possibly enter the object to be inspected. Therefore, a plurality of vibration frequencies are set in advance based on the average product size of the powder and the volume of foreign substances that it is presumed may possibly enter the object to be inspected.

The light source 3 applies light onto the upper surface of the powder. The imaging unit 4 takes an image of the upper surface of the powder at a frame rate equal to or higher than the maximum vibration frequency of the vibration unit 2. The determination unit 5 determines whether or not the object to be inspected is a quality product based on the image information taken by the imaging unit 4.

Figure 2:
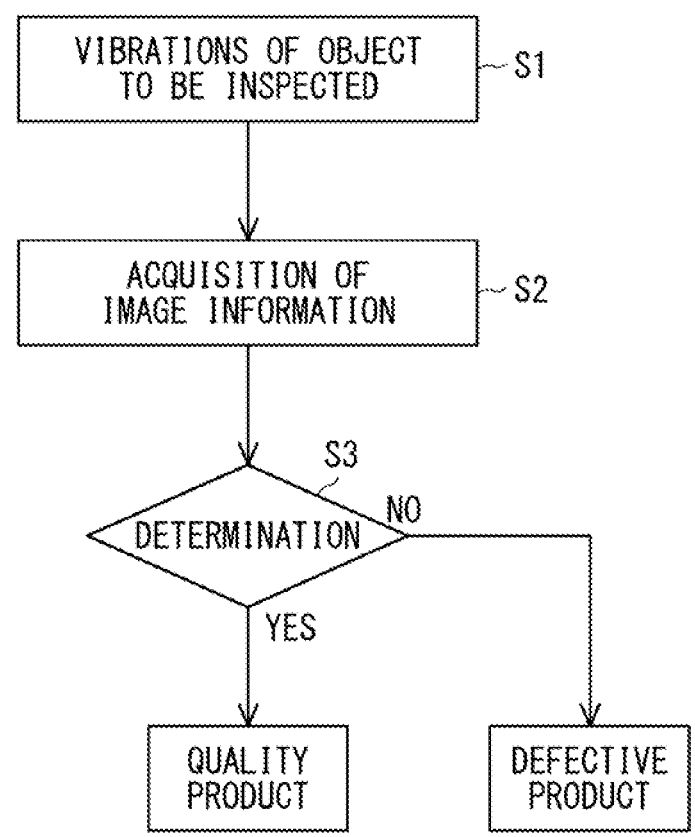
FIG. 2 is a flowchart showing an inspection method according to the first example embodiment.

Next, an inspection method using a product-inspection apparatus according to this example embodiment will be described. FIG. 2 is a flowchart showing an inspection method according to this example embodiment. Firstly, the vibrations of the object to be inspected by the vibration unit 2 are started (S1). In this process, one of a plurality of vibration frequencies that are set in advance is selected, and the object to be inspected is vibrated at the selected vibration frequency.

Then, image information is acquired by photographing the upper surface of the powder of the vibrating object to be inspected (S2). More specifically, the upper surface of the powder of the vibrating object to be inspected is photographed by the imaging unit 4 while applying light onto the upper surface of the powder by the light source 3.

Next, the determination unit 5 determines whether or not the object to be inspected is a quality product based on the acquired image information (S3). Note that when a foreign substance that has a sufficient volume to make that foreign substance float as the object to be inspected is vibrated at the vibration frequency is contained in the powder, the foreign substance floats in the powder and is exposed from the upper surface of the powder.

Therefore, when a foreign substance is detected on the upper surface of the powder based on the acquired image information, the determination unit 5 determines that the foreign substance is contained in the object to be inspected, and determines that the object to be inspected is a defective product (No in S3). On the other hand, when no foreign substance is detected on the upper surface of the powder based on the acquired image information, the determination unit 5 determines that no foreign substance is contained in the object to be inspected, and determines that the object to be inspected is a quality product (Yes in S3).

After that, when the above-described steps S1 to S3 are repeated at different vibration frequencies in a stepwise manner, i.e., repeated for all of the plurality of pre-set vibration frequencies, the operation for inspecting the object to be inspected is finished. As described above, in the product-inspection apparatus 1 and the inspection method according to this example embodiment, it is possible to detect foreign substances having different volumes contained in the object to be inspected by vibrating the object to be inspected at different vibration frequencies in a stepwise manner. Therefore, the product-inspection apparatus 1 and the product-inspection method according to this example embodiment can improve the accuracy of the product-inspection of an object to be inspected.

Figure 3:
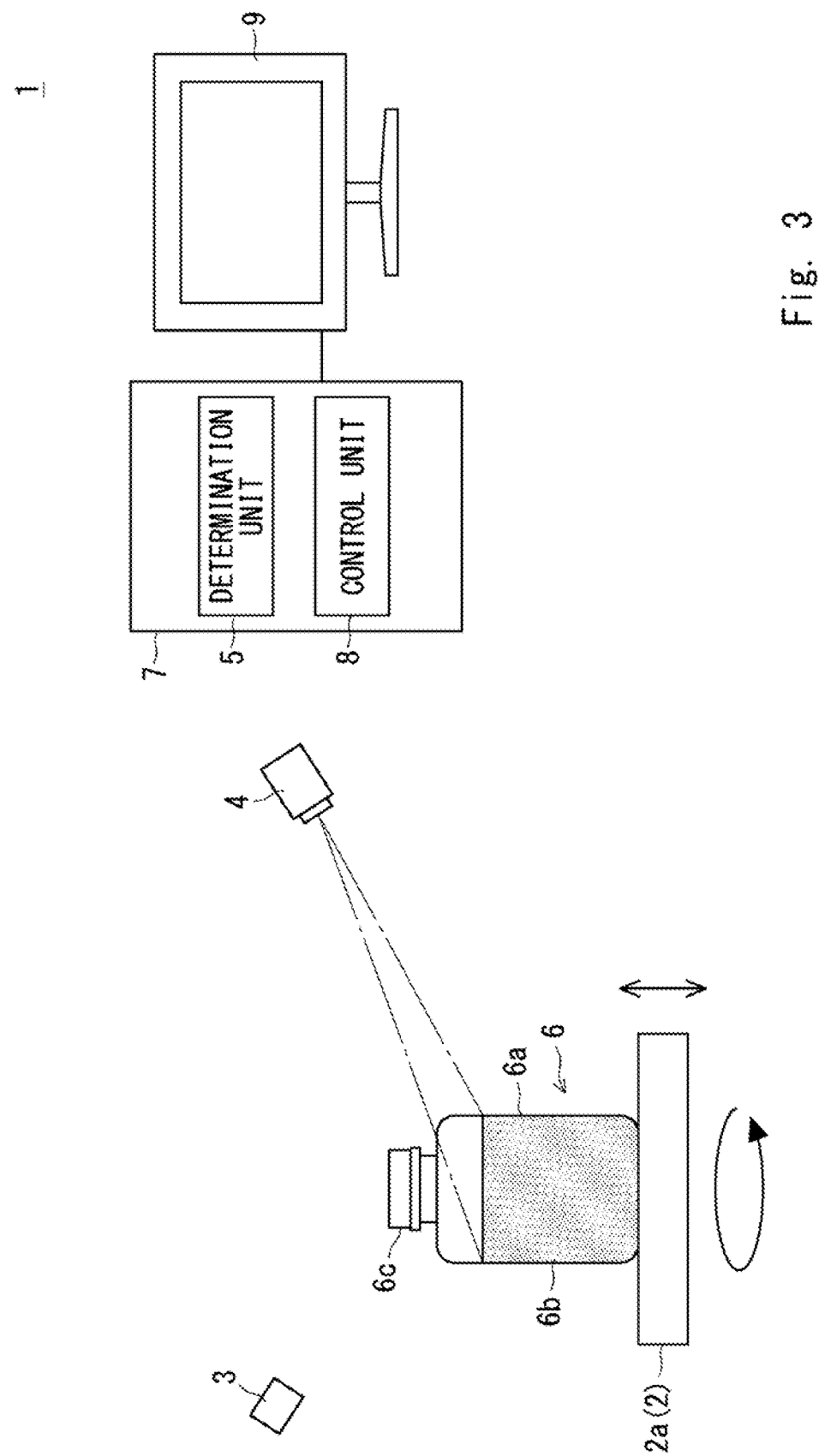
FIG. 3 shows a specific configuration of a product-inspection apparatus according to the first example embodiment.

Next, a specific configuration of the product-inspection apparatus 1 according to this example embodiment will be described. FIG. 3 shows a specific configuration of a product-inspection apparatus according to this example embodiment. Note that, as shown in FIG. 3, for example, the object to be inspected 6 is sealed by a plug 6c in a state in which a powder 6b is contained in a transparent container 6a. However, the object to be inspected 6 may have an arbitrary configuration as long as the powder 6b is hermetically contained in the container 6a and the container 6a is optically transparent.

When the direction of the gravity is defined as a downward direction, the vibration unit 2 vibrates the object to be inspected 6 in the vertical direction. The vibration unit 2 includes, for example, a stage 2a on which the object to be inspected 6 is placed, and is configured to vibrate the stage 2a in the vertical direction. Note that although details of its function will be described later, the stage 2a may be configured so as to rotate around a rotation axis extending in the vertical direction.

The light source 3 applies light having a wavelength range that passes through the container 6a to substantially the entire area on the upper surface of the powder 6b. Note that one light source 3 may irradiate substantially the entire area on the upper surface of the powder 6b from one direction, or a plurality of light sources 3 may irradiate substantially the entire area on the upper surface of the powder 6b from a plurality of directions. Alternatively, substantially the entire area on the upper surface of the powder 6b may be irradiated with light by using a ring light or the like as the light source 3.

The imaging unit 4 includes an image sensor such as a CMOS (Complementary Metal Oxide Semiconductor) or a CCD (Charge Coupled Device), and takes an image of substantially the entire area on the upper surface of the powder 6b. Then, the imaging unit 4 outputs the acquired image information to the determination unit 5.

The determination unit 5 determines whether or not the object to be inspected 6 is a quality product based on the image information acquired as described above, and is disposed, for example, in a processing apparatus 7. The processing apparatus 7 includes a control unit 8 in addition to the determination unit 5. The control unit 8 controls the vibration unit 2, the light source 3, and the imaging unit 4 (which will be described later in detail).

Note that when a display unit 9 is electrically connected to the processing apparatus 7, the control unit 8 may control the display unit 9 so that the acquired image information is displayed in the display unit 9. The display unit 9 includes a display device such as an ordinary liquid-crystal display panel or an organic EL (Electro Luminescence) panel.

Note that when the display unit 9 is equipped with a touch panel disposed on the display device, an inspector can make various settings (e.g., the setting of a plurality of vibration frequencies, the setting of the amplitude of vibrations of the object to be inspected 6, and the like) through the display unit 9. However, the product-inspection apparatus 1 may need to be equipped with an input unit by which an inspector makes various settings.

Figure 4:
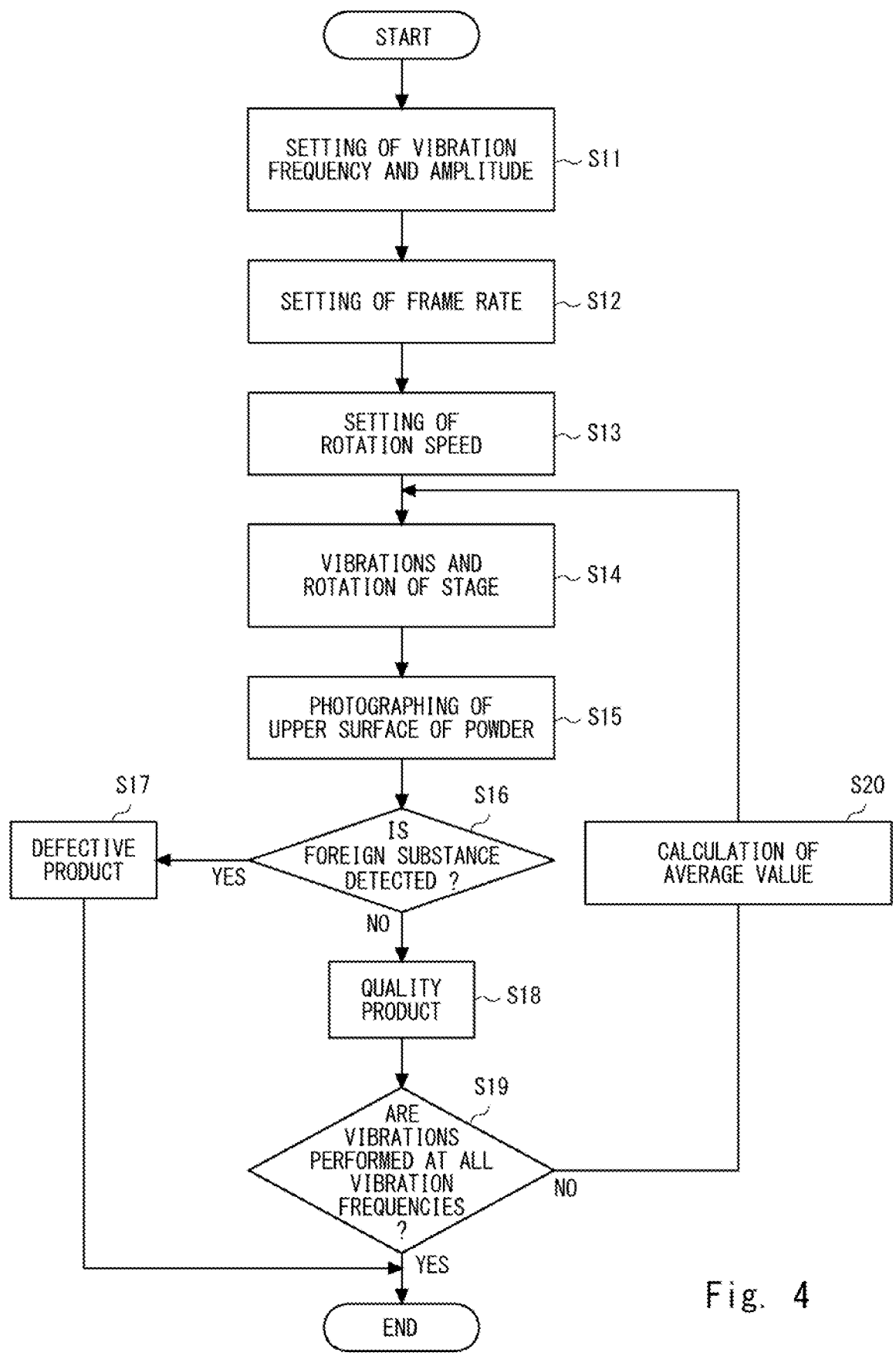
FIG. 4 is a flowchart showing a specific flow of a product-inspection method according to the first example embodiment.

Next, a specific flow of a product-inspection method according to this example embodiment will be described. FIG. 4 is a flowchart showing a specific flow of a product-inspection method according to this example embodiment. Firstly, an inspector sets a plurality of vibration frequencies and the amplitude of vibrations of an object to be inspected 6 through the display unit 9 (S11).

More specifically, the vibration frequency at which a foreign substance floats changes depending on the relation between the average product size of the powder 6b and the volume of the foreign substance that it is presumed may possibly enter the object to be inspected 6. Therefore, a plurality of vibration frequencies are set based on the average product size of the powder 6b and the volume of foreign substances that it is presumed may possibly enter the object to be inspected 6.

For example, the vibration frequency is set to a frequency no lower than 10 Hz and no higher than 500 Hz. Further, the amplitude of vibrations of the object to be inspected 6 is set to an amplitude at least 10 times the average product size of the powder 6b. However, the amplitude of vibrations of the object to be inspected 6 may be any amplitude at which the foreign substance floats.

Note that the average product size can be calculated beforehand by an image analysis method, a light shielding method, a Coulter method, a precipitation method, a laser analysis, a scattering method, or the like. That is, it is possible to calculate the average product size by using an ordinary method for calculating a product diameter.

Next, when a plurality of vibration frequencies and the amplitude of vibrations of the object to be inspected 6 are set, the control unit 8 sets a frame rate of the imaging unit 4 based on the set vibration frequency (S12). If the frame rate is small relative to the vibration frequency, there is a possibility that an image is taken at the moment at which a foreign substance that has been exposed from the upper surface of the powder 6b by vibrating the object to be inspected 6 goes down (i.e., is submerged) into the powder 6b again. Therefore, the control unit 8 sets the frame rate to a value equal to or higher than the maximum vibration frequency of the set vibration frequency range. For example, the control unit 8 sets the frame rate of the imaging unit 4 to 100 fps.

Next, the control unit 8 sets the rotation speed of the stage 2a of the vibration unit 2 based on the set frame rate (S13). For example, when the thickness of a long and thin foreign substance such as hair is smaller than one pixel of the imaging unit 4, the imaging unit 4 may not be able to take an image of that foreign substance in a satisfactory manner even when it photographs the foreign substance from the longitudinal direction of the foreign substance.

Therefore, the control unit 8 makes a setting based on the set frame rate so that the imaging unit 4 can photograph the object to be inspected 6 at least three times while the stage 2a of the vibration unit 2 makes one rotation. However, the stage 2a of the vibration unit 2 may have any rotation speed as long as it does not have such a rotation speed that only parts of the object to be inspected 6 opposite to each other are photographed due to the rotation of the stage 2a.

Next, by controlling the vibration unit 2, the stage 2a is rotated while being vibrated in a state where the object to be inspected 6 is placed on the stage 2a so that the center of the object to be inspected 6 is roughly positioned on the rotation axis of the vibration unit 2 as viewed in the vertical direction (S14).

In this process, the control unit 8 selects one of a plurality of vibration frequencies that are set in advance, and rotates the stage 2a at the set rotation speed of the stage 2a while vibrating the stage 2a at the selected vibration frequency and at the set amplitude. In this way, it is possible rotate the object to be inspected 6 around the rotation axis of the vibration unit 2 (i.e., rotate the object to be inspected 6 on its own axis) while vibrating it.

Figure 5:
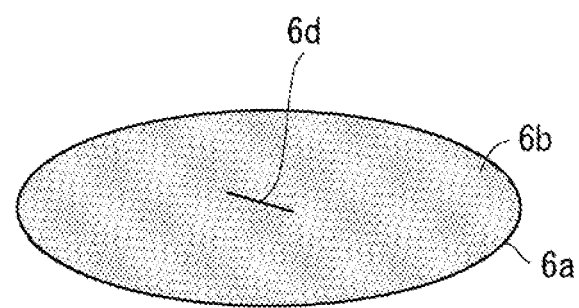
FIG. 5 shows information of an image of the upper surface of a powder.

Then, the control unit 8 controls the light source 3 so as to apply light onto substantially the entire area on the upper surface of the powder 6b of the object to be inspected 6, which is rotating while vibrating, and controls the imaging unit 4 so as to take an image of substantially the entire area on the upper surface of the powder 6b (S15). In this way, the imaging unit 4 acquires image information including at least three images at roughly equal intervals in the circumferential direction of the object to be inspected 6, and outputs the acquired image information to the determination unit 5. Note that FIG. 5 shows image information that is obtained by photographing the upper surface of the powder.

It should be noted that the speed at which a foreign substance 6d, which it is presumed may possibly enter the object to be inspected 6, floats up inside the powder 6b is changed depending on the specific gravity of the foreign substance 6d. Therefore, it is preferred to acquire a plurality of periods over each of which a foreign substance 6d, which it is presumed may possibly enter the object to be inspected 6, moves from the bottom surface of the container 6a to the upper surface of the powder 6b in advance by performing simulations or experiments, and then to rotate the object to be inspected 6 while vibrating it over a period longer than the longest one of the acquired periods. As a result, as shown in FIG. 5, the foreign substance 6d is exposed on the upper surface of the powder 6b. The above-described period over which the object to be inspected 6 is rotated while being vibrated may be set in advance, or may be set by an inspector through the display unit 9.

Next, the determination unit 5 determines whether or not a foreign substance 6d is detected based on the image information (S16). More specifically, the determination unit 5 calculates a difference between the pixel values of pixels that correspond to each other (i.e., equivalent pixels) in pieces of image information that are adjacent to each other in a chronological order (i.e., calculates an inter-frame difference), and determines whether or not there is an inter-frame difference larger than a predetermined threshold. Note that the inter-frame difference and the threshold have absolute values.

When there is an inter-frame difference equal to or larger than the predetermined threshold, the determination unit 5 determines that a foreign substance 6d is detected (Yes in S16), and outputs a result of determination that the object to be inspected 6 is a defective product to the control unit 8 (S17). When the control unit 8 receives the result of determination that the object to be inspected 6 is a defective product, it moves out the object to be inspected 6 into a defective-product lane by controlling, for example, a robot arm (not shown), and finishes the product-inspection operation.

On the other hand, when there is no inter-frame difference equal to or greater than the predetermined threshold, the determination unit 5 determines that no foreign substance 6d is detected (No in S16), and outputs a result of determination that the object to be inspected 6 is a quality product to the control unit 8 (S18).

Next, when the control unit 8 receives the result of determination that the object to be inspected 6 is a quality product, it determines whether or not the object to be inspected 6 has been vibrated at all the set vibration frequencies (S19). When the control unit 8 determines that the object to be inspected 6 has been vibrated at all the set vibration frequencies (Yes in S19), it moves out the object to be inspected 6 into a quality-product lane by controlling, for example, a robot arm (not shown), and finishes the product-inspection operation.

On the other hand, when the control unit 8 determines that the object to be inspected 6 has not been vibrated at all the set vibration frequencies (No in S19), it performs the steps S14 to S19 at a different vibration frequency. Note that the control unit 8 may calculate an average value of inter-frame differences at all the pixels in the previous vibration operation for the object to be inspected 6 (S20), and may subtract the calculated average value of inter-frame differences at the pixels in the previous vibration operation from the calculated inter-frame differences at the pixels in the current vibration operation. In this way, even if the upper surface of the powder 6b has been deformed due to the vibrations when the object to be inspected 6 is making one rotation and this deformation has affected the inter-frame differences, it is possible prevent the deformation from being mistakenly detected as a foreign substance 6d.

As described above, in the product-inspection apparatus 1 and the product-inspection method according to this example embodiment, it is possible to detect foreign substances 6d having different volumes contained in the object to be inspected by vibrating the object to be inspected 6 at different vibration frequencies in a stepwise manner. Therefore, the product-inspection apparatus 1 and the product-inspection method according to this example embodiment can improve the accuracy of the product-inspection of an object to be inspected 6.

In addition, a plurality of parts of the object to be inspected 6 in the circumferential direction thereof are photographed (i.e., the object to be inspected 6 is photographed from different directions) while the object to be inspected 6 is rotated so that the object to be inspected 6 makes one rotation. Therefore, even if the foreign substance 6d is a long and thin product such as hair and the foreign substance 6d cannot be photographed in one piece of image information, the foreign substance 6d can be photographed in other pieces of image information. Therefore, it is possible to improve the accuracy of the product-inspection of an object to be inspected 6.

Further, since the upper surface of the powder 6b is photographed at a frame rate equal to or higher than the maximum vibration frequency, the possibility that the foreign substance 6d can be photographed at the moment at which the foreign substance 6d is exposed on the upper surface of the powder 6b is high.

Second Example Embodiment

When light is applied onto the upper surface of the powder 6b by the light source 3, there is a possibility that a shadow of the container 6a appears on the upper surface of the powder 6b. Further, in the configuration of the product-inspection apparatus 1 according to the first example embodiment, the shadow of the container 6a appears in a fixed place on the upper surface of the powder 6b.

Note that in a group of pixels corresponding to the part on the upper surface of the powder 6b where the shadow appears, inter-frame differences between pixels corresponding to each other in pieces of image information adjacent to each other in a chronological order are smaller than those in a group of pixels corresponding to a part on the upper surface of the powder 6b where no shadow appears.

Therefore, the steps of S11 to S15 are performed in advance by using the object to be inspected 6 as a sample. Then, based on the acquired image information, the pixels are divided into a first group of pixels corresponding to a part on the upper surface of the powder 6b where a shadow appears and a second group of pixels corresponding to a part where no shadow appears.

Then, inter-frame differences between pixels corresponding to each other in pieces of image information adjacent to each other in a chronological order are calculated, and an average value of inter-frame differences in the first group of pixels and an average value of inter-frame differences in the second group of pixels are calculated.

Further, for example, a ratio of the average value of inter-frame differences in the second group of pixels to the average value of inter-frame differences in the first group of pixels may be calculated. Then, when the object to be inspected 6 is inspected, the pixel values of pixels in the first group of pixels may be corrected by multiplexing them by the calculated ratio.

In this way, it is possible to cancel out the shadow that appears on the upper surface of the powder 6b can, and thereby to prevent a foreign substance 6d from being undetected due to the shadow. Note that a value that is obtained by dividing the threshold used for detecting a foreign substance 6d in the second group of pixels by the calculated ratio may be used as the threshold used for detecting a foreign substance 6d in the first group of pixels. That is, the threshold used for detecting a foreign substance 6d in the first group of pixels may be made smaller than the threshold used for detecting a foreign substance 6d in the second group of pixels by a factor of the calculated ratio.

Other Example Embodiment

Note that although the present invention is described as a hardware configuration in the above-described first and second example embodiments, the present invention is not limited to the hardware configurations. In the present invention, the processes in each of the components can also be implemented by having a CPU (Central Processing Unit) execute a computer program.

Figure 6:
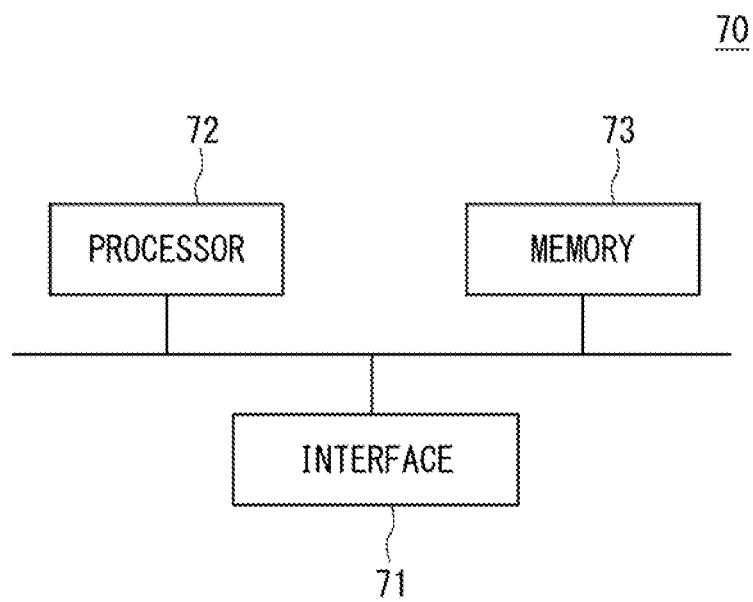
FIG. 6 shows an example of a hardware configuration included in a processing apparatus.

For example, the processing apparatus 7 according to any of the above-described example embodiments can have the below-shown hardware configuration. FIG. 6 shows an example of a hardware configuration included in the processing apparatus 7.

An apparatus 70 shown in FIG. 6 includes a processor 72 and a memory 73 as well as an interface 71. The processing apparatus 7 described in the above example embodiments is implemented as the processor 72 loads and executes a program stored in the memory 73. That is, this program is a program for causing the processor 72 to function as the processing apparatus 7 shown in FIG. 3.

The above-described program may be stored by using various types of non-transitory computer readable media and supplied to a computer (computers including information notification apparatuses). Non-transitory computer readable media include various types of tangible storage media. Examples of the non-transitory computer readable media include magnetic recording media (e.g., a flexible disk, a magnetic tape, and a hard disk drive), and magneto-optical recording media (e.g., a magneto-optical disk). Further, the example includes a CD-ROM (Read Only Memory), a CD-R, and a CD-R/W. Further, the example includes a semiconductor memory (e.g., a mask ROM, a PROM, an EPROM, a flash ROM, and a RAM). Further, the program may be supplied to a computer by various types of transitory computer readable media). Examples of the transitory computer readable media include an electrical signal, an optical signal, and electromagnetic waves. Transitory computer readable media can provide the program to a computer via a wired communication line (e.g., electric wires, and optical fibers) or a wireless communication line.

Note that the present disclosure is not limited to the above-described example embodiments, and they may be modified as desired without departing from the scope and spirit of the disclosure. Further, the present disclosure may be implemented by combining the above-described example embodiments with one another as desired.

In the above-described example embodiments, a plurality of different parts of the object to be inspected 6 in the circumferential direction thereof are photographed by rotating the object to be inspected 6. However, a plurality of different parts of the object to be inspected 6 in the circumferential direction thereof may be photographed by arranging a plurality of imaging units 4 around the object to be inspected 6 without rotating the object to be inspected 6. Further, the object to be inspected 6 is rotated on its own axis which coincides with the rotation axis of the vibration unit 2. However, the object to be inspected 6 may be poisoned so that the object to be inspected 6 revolves around the rotation axis of the vibration unit 2. To put it briefly, any configuration may be used as long as different parts of the object to be inspected 6 in the circumferential direction thereof can be photographed.

In the above-described example embodiments, the vibration frequency is set according to the average product size of the powder 6*b* and the volume of foreign substances 6*d* that it is presumed may possibly enter the object to be inspected 6. However, the vibration frequency may be set according to the distribution of product sizes of the powder 6*b* and the volume of foreign substances 6*d* that it is presumed may possibly enter the object to be inspected 6. Further, the vibration frequency may be set according to the surface area or the volume of the powder 6*b* and the volume of foreign substances 6*d* that it is presumed may possibly enter the object to be inspected 6. Further, the vibration frequency may be set according to the friction between the powder 6*b* and the object to be inspected 6.

Although the vibration unit 2 according to the above-described example embodiments has a configuration in which the object to be inspected 6 is placed thereof, the vibration unit 2 may be configured so as to grasp the object to be inspected 6, and to vibrate and/or rotate the object to be inspected 6 in the holding state. Further, the vibration unit 2 may be, for example, a conveyance table for the object to be inspected 6 disposed in a conveyance line for the object to be inspected 6. To put it briefly, the vibration unit 2 may have any configuration as long as it can vibrate at least the object to be inspected 6.

REFERENCE SIGNS LIST

1 PRODUCT-INSPECTION APPARATUS
2 VIBRATION UNIT
2A STAGE
3 LIGHT SOURCE
4 IMAGING UNIT
5 DETERMINATION UNIT
6 OBJECT TO BE INSPECTED
6A CONTAINER
6B POWDER
6C PLUG
6D FOREIGN SUBSTANCE
7 PROCESSING APPARATUS
8 CONTROL UNIT
9 DISPLAY UNIT
70 APPARATUS
71 INTERFACES
72 PROCESSOR
73 MEMORY

What is claimed is:

1. A product-inspection apparatus comprising:
a stage on which an object to be inspected is placed and then vibrated at different vibration frequencies in a stepwise manner, the object to be inspected including a container of powder, the vibration causing any foreign substance in the powder to migrate towards a top of the powder;
a light source configured to output light onto the top of the powder;
an an image sensor configured to capture images of the top of the powder at a frame rate equal to or higher than a maximum vibration frequency at which the object to be inspected is vibrated;
a processor; and
a memory storing instructions executable by the processor to determine whether or not the powder includes any foreign substance based on the captured images.

2. The product-inspection apparatus according to claim 1, wherein when a direction of gravity is defined as a downward direction of the object to be inspected, the the object to be inspected is vibrated in a vertical direction.

3. The product-inspection apparatus according to claim 1, wherein when a direction of gravity is defined as a downward direction of the object to be inspected, the the object to be inspected rotated on the stage so that the object to be inspected makes one rotation around a rotation axis extending in a vertical direction during the vibration at each of the vibration frequencies.

4. The product-inspection apparatus according to claim 3, wherein the images are captured during the one rotation of the object to be inspected during the vibration at each of the vibration frequencies.

5. The product-inspection apparatus according to claim 4, wherein at least three images are captured at equal intervals in a circumferential direction of the object to be inspected during the vibration at each of the vibration frequencies.

6. The product-inspection apparatus according to claim 1, wherein the vibration frequencies are set according to an average product size of the powder and a predetermined volume of foreign substance presumed to be present.

7. The product-inspection apparatus according to claim 1, wherein the instructions are executable by the processor to calculate a difference between pixels corresponding to one other in chronically adjacent of the images, and determine that foreign substance is present when the calculated difference is equal to or larger than a predetermined threshold.

8. A product-inspection method comprising:
placing an object to be inspected on a stage and vibrating the object to be inspected at different vibration frequencies in a stepwise manner, the object to be inspected including a container of powder, the vibration causing any foreign substance in the powder to migrate towards a top of the powder;
outputting light onto the top of the powder;
capturing images of the top of the powder at a frame rate equal to or higher than a maximum vibration frequency at which the object to be inspected is vibrated; and
determining whether or not the powder includes any foreign substance based on the captured images.

9. The product-inspection method according to claim 8, wherein when a direction of gravity is defined as a downward direction of the object to be inspected, the the object to be inspected is vibrated in a vertical direction.

10. The product-inspection method according to claim 8, wherein when a direction of gravity is defined as a downward direction of the object to be inspected, the object to be inspected rotated on the stage so that the object to be inspected makes one rotation around a rotation axis extending in a vertical direction during the vibration at each of the vibration frequencies.

11. The product-inspection method according to claim 10, wherein the images are captured during the one rotation of the object to be inspected during the vibration at each of the vibration frequencies.

12. The product-inspection method according to claim 11, wherein at least three images are captured at equal intervals in a circumferential direction of the object to be inspected during the vibration at each of the vibration frequencies.

13. The product-inspection method according to claim 8, wherein the vibration frequencies are set according to an average product size of the powder and a predetermined volume of foreign substance presumed to be present.

14. The product-inspection method according to claim 8, wherein a difference between pixels corresponding to one other in chronically adjacent of the images is calculated, and that foreign substance is presented is determined when the calculated difference is equal to or larger than a predetermined threshold.

15. A non-transitory computer readable medium storing a program for causing a computer to:
place an object to be inspected on a stage and vibrate the object to be inspected at different vibration frequencies in a stepwise manner, the object to be inspected including a container of powder, the vibration causing any foreign substance in the powder to migrate towards a top of the powder;
output light onto the top of the powder;
capture images of the top of the powder at a frame rate equal to or higher than a maximum vibration frequency at which the object to be inspected is vibrated; and
determine whether or not the powder includes any foreign substance based on the captured images.

\* \* \* \* \*